United States Patent [19]

Clyne et al.

[11] 4,291,750
[45] Sep. 29, 1981

[54] SELECTIVE EXTRACTION HEAT STORAGE UNIT

[75] Inventors: Arthur J. Clyne, Alma; John E. Knarr, Lansing; Stanley Miller, Alma, all of Mich.

[73] Assignee: Energy Recycling Company, Lansing, Mich.

[21] Appl. No.: 173,256

[22] Filed: Jul. 29, 1980

Related U.S. Application Data

[63] Continuation of Ser. No. 23,216, Mar. 23, 1979, abandoned.

[51] Int. Cl.³ ............................................. F28D 21/00
[52] U.S. Cl. ..................................... 165/34; 165/39; 165/40; 165/35; 126/435; 126/436; 165/104.17
[58] Field of Search .................. 165/34, 35, 39, 40, 165/104 S; 126/435, 436

[56] References Cited

U.S. PATENT DOCUMENTS

| | | | |
|---|---|---|---|
| 4,031,879 | 6/1977 | Parham | 165/104 S X |
| 4,114,600 | 9/1978 | Newton | 165/104 S X |
| 4,173,993 | 11/1979 | Skala | 165/104 S X |

FOREIGN PATENT DOCUMENTS

| | | | |
|---|---|---|---|
| 52-16840 | 8/1977 | Japan | 165/104 S |
| 398927 | 9/1933 | United Kingdom | 165/104 S |

Primary Examiner—Albert W. Davis
Attorney, Agent, or Firm—Griffin, Branigan & Butler

[57] ABSTRACT

A selective extraction heat storage assembly (32) for use in a system including a plurality of such assemblies (32a-c) and for use by itself, includes a heat unit (10) connected in parallel with a fluid circulating passage (54) and has a separate unit heat extractor (exchanger) (34) mounted in the unit (10). The unit (10) can be charged and discharged by fluid flow through the unit caused by an outside fluid circuit and can be similarly discharged thereby. However, in addition, the unit can be charged and discharged by means of the separate unit heat extractor (exchanger) (34) within the unit by closing off the heat storage assembly from the outside fluid circuit and circulating fluid through the unit via the parallel fluid circulating passage (54). A pump (42), several sensors (46 and 52), and valves (44 and 60) form a part of the heat storage assembly to provide for this operation. When several of these assemblies (32) are connected in parallel, they can each be independently isolated from the system and their respective units charged and discharged without affecting the other assemblies and their heat units.

13 Claims, 4 Drawing Figures

SELECTIVE EXTRACTION HEAT STORAGE UNIT

This is a continuation, of application Ser. No.23,216, filed Mar. 23, 1979 now abandoned.

BACKGROUND OF THE INVENTION

This invention relates broadly to heat storage systems and particularly to systems for storing solar energy and recycled discharge heat.

As used herein, the terminology "heat storage unit" refers to an energy assembly of one or more cells which receives energy in the form of heat, stores this energy, and thereafter furnishes this energy in the form of heat upon demand therefor.

U.S. Pat. No. 4,127,161 to Clyne et al., describes an energy storage assembly and system wherein a plurality of fusion-type heat storage units are connected in parallel with a heat exchanger. To charge the units, solar or waste heat is fed into the heat exchanger where it is picked up by a heat transfer fluid which flows around cells in the respective units to sequentially melt substances in these cells and thereby store energy in the cells. To discharge the system, the heat transfer fluid is, again, pumped through the units and the heat exchanger to thereby pick up heat from substances in the cells (as they become frozen) which is taken out of the system at the heat exchanger.

A limitation of this prior-art system is that heat energy cannot be discharged from the system at several selected predetermined temperatures simultaneously. That is, the system only allows the extraction of one-temperature heat energy at a time. Thus, it is an object of this invention to provide a heat storage system which allows the discharge of heat at several temperatures simultaneously.

Another limitation of the above described system is that during periods when high temperature fluid is available from solar sources, or waste sources, one cannot necessarily store this energy at the high temperature in a high temperature unit. This is because heat may also be required to be simultaneously discharged from the system causing the total fluid temperature to be reduced. Thus, it is an object of this invention to provide a system which allows an available high temperature charging fluid to charge a high-temperature unit while simultaneously allowing another unit of the system to be discharged.

Still another limitation of the prior art was that the various heat storage assemblies could only be used with an external heat exchanger thus lowering the efficiency and increasing the expense of the system when only one heat storage assembly is used. It is therefore another object of this invention to provide a heat storage assembly which does not require an external heat exchanger for the charging and discharging thereof.

It is still another object of this invention to provide a heat storage assembly which can be used in a parallel system, or which can be used alone advantageously.

Finally, it is an object of this invention to provided a fusion-type heat storage assembly which can be economically manufactured and which is efficient in operation.

SUMMARY OF THE INVENTION

According to principles of this invention, a fusion-type heat storage assembly includes a fusion-type heat storage unit connected in parallel with a fluid circulating passage tube and a unit heat extractor (heat exchanger) which is in series with the unit. The unit is normally charged by closing the parallel fluid circulation passage and causing transfer fluid flow from an external system through the unit and its associated heat extractor (exchanger). Although the system can also be discharged in this manner, it can, in addition, be discharged by isolating the assembly from the external system with valves, circulating transfer fluid through the parallel fluid circulation passage, and discharging heat with the unit heat extractor (exchanger). The unit could also be charged by inserting heat into a unit heat extractor (heat exchanger) while circulating the fluid. A separate pump and various valves and sensors are included in the assembly to accomplish the above.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF PREFERRED EMBODIMENTS OF THE INVENTION

Figure 1:
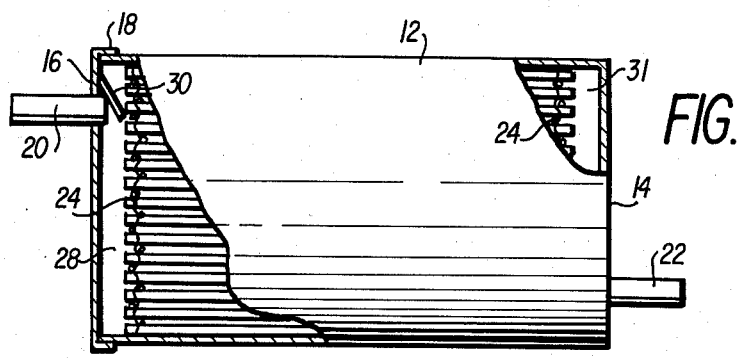
FIG. 1 is a side view, partially broken away, of a prior-art heat storage unit of a type used in this invention.

The basic heat storage unit of the general type used in this invention (shown in FIGS. 1 and 2) is described in greater detail in U.S. Pat. No. 4,127,161 to Clyne et al. It comprises a cylindrical housing 12 having a sealed end 14 and a removable end closure 16. When in use, the end closure 16 is mounted to the cylinder 12 by fasteners 18. To prevent leakage of heat transfer fluid, a gasket is used between the closure 16 and cylinder 12. A fluid flow inlet pipe 20 is fixed to the end closure 16 and an outlet pipe 22 is fixed to end plate 14.

Figure 2:
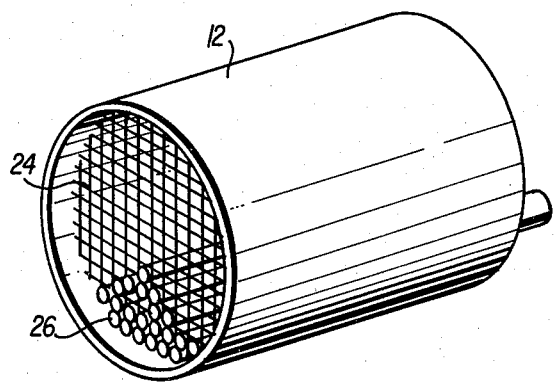
FIG. 2 is an isometric view of the heat storage unit of FIG. 1, partially filled with containers (cells) and with an end closure being removed.

A planar support member, shown as screen 24 in FIG. 2, is provided adjacent and parallel to each end plate of the assembly. These screens are fixed within the cylinder for supporting heat storage containers or cells 26. These containers or cells 26 are in the form of closed tubes., The tubes are individually removable from the assembly and an access plug is provided at one end of each tube so that a heat storage substance contained therein can be easily replaced.

Referring to FIG. 1, when in use a heat transfer fluid will be directed from an inlet pipe 20 into an entrance space 28 by a fluid flow deflector 30. Deflector 30 has holes therein so that while some fluid is deflected downwardly, other fluid is diffused into the space above the deflector. The fluid will then pass through the screen 24, flow around the heat storage tubes 26, and into an exit space 31 toward outlet pipe 22. The screens 24 serve the dual purpose of supporting the heat storage tubes and diffusing the heat transfer fluid. If heat transfer fluid has a temperature greater than the melting point of the heat storage substance within each cell 26, heat will be transfered to the heat storage substance, melting the substance. Heat will then be stored as latent heat of fusion until a cooler heat transfer fluid flows through the system. At such time, the heat storage substance will solidify, transferring the heat of fusion into the heat of the transfer fluid.

Figure 3:
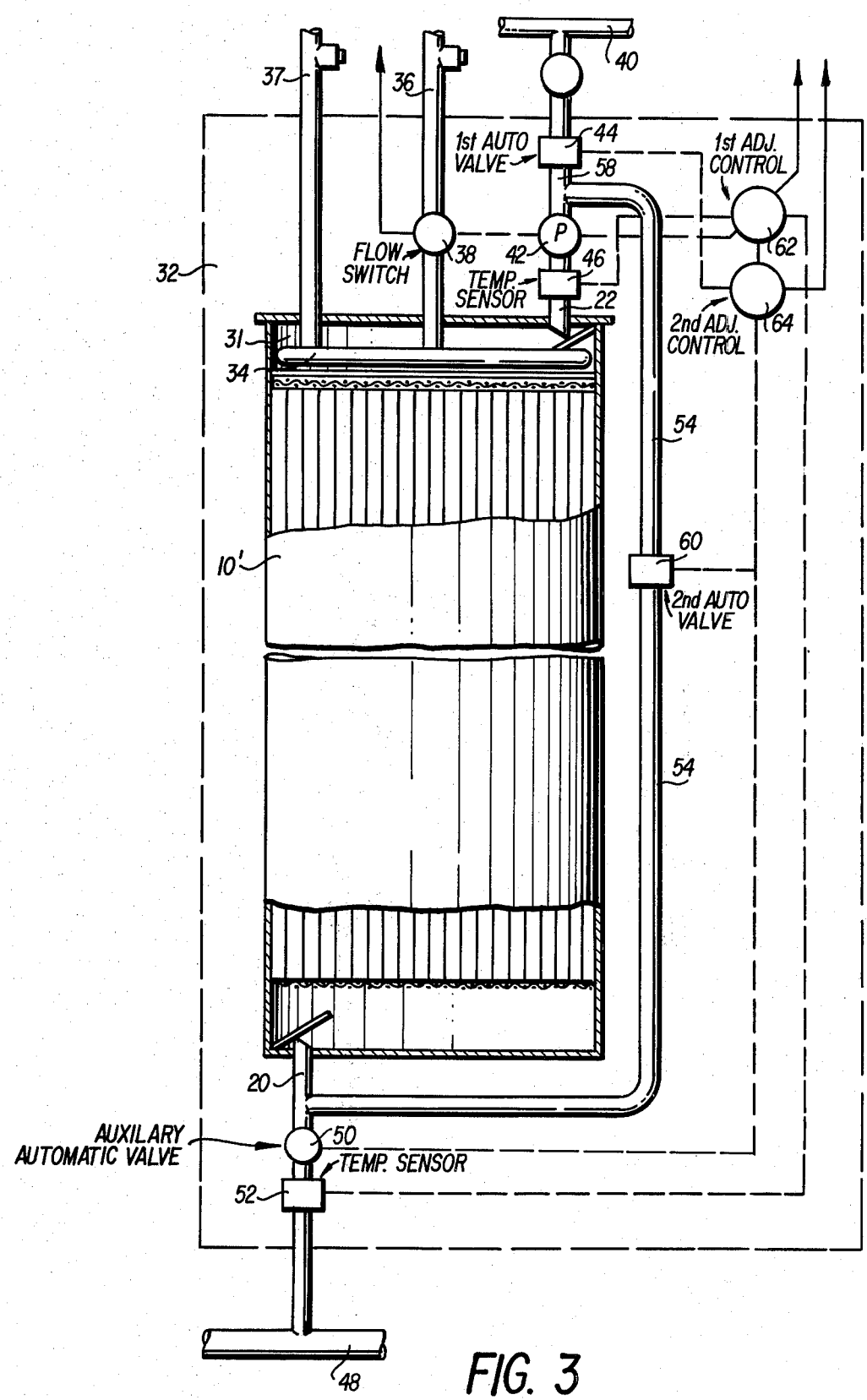
FIG. 3 is a schematic diagram of a heat storage assembly of this invention employing a modified heat storage unit.

Referring next to FIG. 3 where a heat storage assembly 32 is depicted which employs a modified unit 10', this unit further includes a unit heat extractor (or heat exchanger) 34 in the exit space 31. The purpose of the unit heat extractor 34 will be clearer once the entire heat storage assembly 32 has been described and its operation explained. Inlet and outlet heat extractor tubes 36 and 37 are coupled to the unit heat extractor 34. The heat extractor 34 is a spiral system of tubes over which transfer fluid flowing toward the outlet pipe 22 flows. A flow switch 38 is mounted on the inlet heat extractor tube 36 for monitoring the fluid flow therethrough.

The outlet pipe 22 is coupled to a transfer fluid exhaust terminal 40 (such as a heat storage system) via a unit electric pump 42 and a first automatic valve 44. A temperature sensor 46 monitors the temperature of transfer fluid flowing through the outlet pipe 22 from the unit 10'.

The inlet pipe 20 is coupled to a transfer fluid source terminal 48 via an auxiliary automatic valve 50. A second temperature sensor 52 monitors the temperature of transfer fluid flowing from the transfer fluid source terminal 48 toward the inlet pipe 20.

A bypass circulation tube 54 is coupled to the inlet pipe 20 and is coupled to an outlet tube 58 between the electric pump 42 and the first automatic valve 44. A second automatic valve 60 is connected in the bypass circulation tube 54.

The first and second temperature sensors 46 and 52 are electrically, hydraulically, or otherwise, linked to a first adjustment control 62 and the first and second automatic valves 44 and 60 are linked to a second adjustment control 64. These controls are, in turn, linked.

Describing operation of the selective extraction heat storage unit 32 of FIG. 3, before the unit 10' is charged, the automatic valve 60 is closed and the automatic valves 44 and 50 are open. Thus, hot transfer fluid flows from the transfer fluid source terminal 48, carrying heat therewith, into the heat unit 10'. Substances in the cells 26 are melted by this heat thereby storing the energy in the cells 26. In this respect, during charging of the heat unit 10', the pump 42 is not pumping, but rather is merely acting as an open circuit to allow heat transfer fluid to pass from the unit outlet 22 to the transfer fluid exhaust terminal 40. The transfer fluid is driven by a system source coupled to the terminals 40 and 48.

When the unit 10' is fully charged (all the substances are melted) the inlet temperature to the heat storage assembly, as measured by the second temperature sensor 52, is substantially equal to (or less than if heat is being extracted therefrom) the discharge temperature of the heat storage unit 10', as measured by the temperature sensor 46, the first control device 62 ascertains this and instructs the second control device 64 to close the first automatic valve 44, and auxiliary automatic valve 50, and open the second automatic valve 60. In addition, the first control device 62 instructs the assembly circulation pump 42 that it can pump when the need arises.

In this mode of operation, heat can be selectively extracted from the heat unit 10' via the unit heat extractor 34 by circulating a fluid through the inlet and outlet heat extractor tubes 36 and 37. If this is done, the flow switch 38 senses such fluid flow and instructs the pump 42 to pump. When the unit circulation pump 42 pumps, it causes clockwise (FIG. 3) fluid flow through the bypass circulation tube 54 and through the heat unit 10'. It must be remembered that in this mode, the heat storage assembly 32 is effectively isolated from the transfer fluid source terminal 48 and the transfer fluid exhaust terminal 40 by the valve 44 and auxiliary valve 50 which are closed. Thus, with this heat storage assembly its unit 10' can be charged by an external source, and once charged isolated from the external source and then selectively discharged by a unit heat extractor 34.

The heat extractor 34 is preferably of a solid, copper or other high conduction, perforated metal plate to which a copper or other high conduction metal tube is attached in a single, continuous, spiral circle which will allow maximum amount of metal tube to be inserted in the space 31 without interference of the general flow of heat-transfer fluid through the heat unit 10'. Another method of constructing the heat extractor 34 is to insert a copper, or other high conduction metal, tubing through a series of $2\frac{1}{2}$ inch copper or other aluminum fins, spaced $\frac{1}{4}$ inch apart, then forming the finned, tube structure into a concentric circle allowing the two ends of the copper tube to extend through the exterior surface of the unit 10'. The two extended ends of the tube become the inlet heat extractor tube 36 and the outlet heat extractor tube 37.

Figure 4:
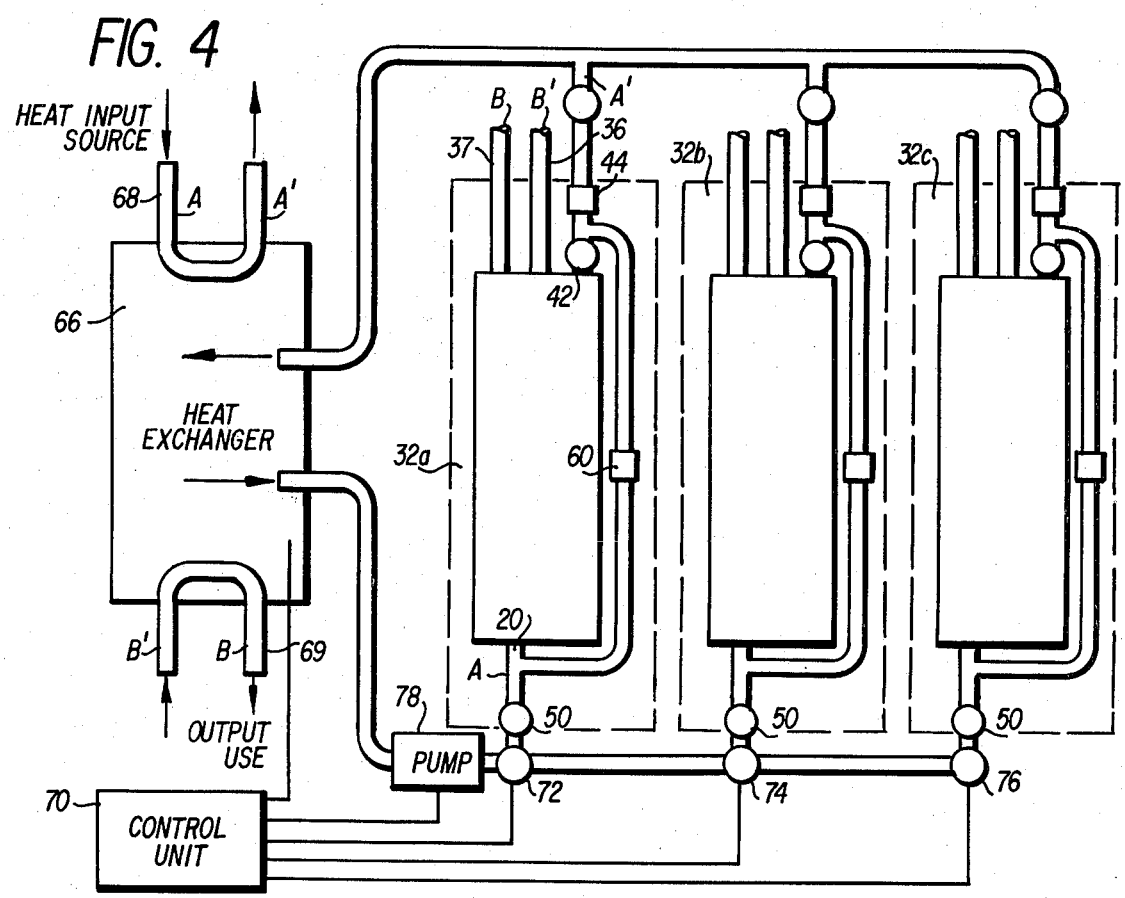
FIG. 4 is a schematic diagram of a heat storage system combining several of the heat storage assemblies of FIG. 3.

Turning next to FIG. 4 wherein three heat extractor assembly 32a, 32b and 32c, each being identical to the assembly shown in detail in FIG. 3, are shown connected in parallel in a heat storage system. This broad system is described in detail in U.S. Pat. No. 4,127,161 of Clyne et al., although in that patent the heat storage assembly are not the improved assembly (32a-c) depicted in FIG. 3.

Basically, the system of FIG. 4 will operate automatically to store heat when the heat input to a heat exchanger 66 from a pipe 68 exceeds the heat output from pipe 69. The system will automatically remove heat from the storage system when the output of heat from the heat exchanger exceeds the input.

To understand the overall operation of the system in FIG. 4, first assume that the heat transfer fluid in the heat exchanger 66 is cool and that no heat is stored in the system. At this point, a control unit 70 will act to close valves 72, 74 and 76, and to shut off a system pump 78, thereby preventing heat transfer fluid flow through the system. With an input of heat from pipe 68 greater than the output through the pipe 69, the temperature of heat transfer fluid in the heat exchanger will increase. As this temperature reaches a predetermined level and before it approaches the melting termperature of heat storage substances found in the assembly 32a, valve 72 will be opened and system pump 78 will be turned on to cause a flow of heat transfer fluid through the assembly 32a. It should be remembered that at this point, as was described above with reference to FIG. 3, the automatic valves 44 and 50 are open and the valve 60 is closed while the assembly circulation pump 42 is acting as an open transmission element. As the transfer fluid heats up beyond the melting point of the storage substance found in the unit 10' of assembly 32a, large amounts of heat will be transferred from the transfer fluid into the substance, thereby melting the substance. Heat will thus be stored within the substance as a latent heat of fusion. When the storage substance in the unit 10' of the assembly 32a has completely melted, this unit 10' will be charged. At this point, as was described with reference to the assembly of FIG. 3, the automatic valves 44 and 50 will be closed and the bypass valve 60 will be opened, thus isolating this heat assembly from the remainder of the system.

So long as the temperature of the heat transfer fluid remains at or above the melting temperature of the assembly 32a, valve 72 will remain open. If the heat transfer fluid temperature continues to increase, valve 74 will open as the temperature approaches the melting temperature of the assembly 32b. This assembly will then charge in the same manner as did the assembly 32a.

Similarly, valve 76 will open as the temperature of transfer fluid approaches the melting temperature of the assembly 32c. Additional assemblies may be added as desired to increase the flexibility and efficiency of the system.

In the similar system described in U.S. Pat. No. 4,127,161, heat was extracted therefrom only at the output pipe 69 of the heat exchanger 66. However, with the system described above with reference to FIG. 4, heat can now be extracted from the respective heat extractors 34 of each of the respective assemblies by merely circulating fluid through inlet and outlet heat extractor tubes 36 and 37 which, in turn, triggers the circulation of fluid via the bypass circulation tube 54 as caused by the assembly circulation pump 42.

This system offers significant advantages over the previous system. For example, in a solar application where the incoming temperature varies from morning to midday, and again diminishes in the afternoon, the heat and hot water requirements of a home often require the extraction of heat during a charging cycle. With the system of FIG. 4, heat can be extracted from the assembly 32a, for example, without lowering the temperature of the transfer fluid which is being used to charge assemblies 32b or c. In a solar application, this is a most significant advantage. To understand this, one should keep in mind that the maximum efficiency of all heat of fusion devices occurs at a fixed temperature (the temperature of fusion or melting). For example, let us assume that at a given point of time the heat storage assembly 32c is being charged with a 180° transfer fluid coming from the heat exchanger 66. Let us further assume that earlier in the day the assembly 32a was charged at a 110° transfer temperature. Now lets assume that the heating system in a house calls for 110° hot water. If heat were taken from the heat exchanger 66, as was previously done, the temperature of the heat transfer fluid could be lowered below 180°, thereby preventing further charging of the assembly 32c. However, with the system of FIG. 4, heated fluid can be extracted from the assembly 32a with its heat extractor 34 by circulating transfer fluid through its unit 10' and its bypass circulation passage 54.

In this same manner, the system of FIG. 4 can provide water at two different temperatures, for example, 180° heat suitable for space heating in a home, and 110° heat for hot water for bathing. This feature is also beneficial for factories and the like which use fluids at different temperatures.

Although it is not depicted in the drawings, another embodiment of a system for using the selective-extraction heat storage assembly of this system is as a one assembly system. In this embodiment, the heat exchanger 66 would be eliminated as would all except one selective extraction heat storage assembly 32. For example, only heat extraction assembly 32a would be used. In this embodiment, the input pipe 68, at A and A' (FIG. 4) is respectively attached to the inlet and outlet pipes of the selective extraction heat storage assembly 32a at A and A'. Similarly, the pipe 69 at B and B' is respectively attached to the outlet pipe 37 and inlet pipe 36 of the extractor assembly 32a at B and B'. In other words, the extracting assembly 32a replaces the heat exchanger 66. In this embodiment, the assembly 32a is charged normally by flowing fluid through the heat input source pipe 68 and is discharged normally by the heat extractor 34. Thus, the same assembly that was used in the above system of FIG. 4, can also be used in a single assembly system advantageously.

It will be understood by those skilled in the art that the selective extraction heat storage assembly described herein, can be advantageously used to increase the effectiveness of heat storage systems by increasing the flexibility thereof, and by allowing lower temperature assemblies to be selectively discharged while higher temperatures assemblies continue to be charged. Further, the selective extraction heat storage assemblies described herein can be used in single assembly systems.

While the invention has been particularly shown and described with reference to preferred embodiments, it will be understood by those skilled in the art that various changes in form and detail may be made therein without departing from the spirit and scope of the invention.

The embodiments of the invention in which an exclusive property or privilege are claimed are defined as follows:

1. A heat storage system of the type in which heat from a heat transfer fluid is transferred to a heat storage substance when the transfer fluid temperature is greater than the melting temperature of the storage substance such that heat is stored in the substance as heat of fusion, and wherein heat is transferred from said substance to the transfer fluid when the transfer fluid temperature is less than the melting temperature of the substance, said heat storage system comprising:

at least two heat storage container means positioned in heat transfer relationship with a heat transfer fluid flow passage, each heat storage container means having a heat storage substance therein, the heat storage substance in each container means being selected such that the melting temperature of the heat storage substance in each container means will be less than the expected high temperature of the heat transfer fluid in the system and greater than the expected low temperature of the heat transfer fluid, a first of said container means having therein a heat storage substance of a first melting temperature and a second of said container means having therein a heat storage substance of a second melting temperature other than said first melting temperature, and a source of said heat transfer fluid and means for causing the heat transfer fluid to flow from said source through the heat storage fluid flow passage such that heat of a first temperature will be stored as heat of fusion in said first container means and heat of a second temperature will be stored as heat of fusion in said second container means;

said first container means being supported in a unit portion of a first heat storage assembly forming a first portion of said fluid passage, and said second container means being supported in a unit portion of a second heat storage assembly forming a second portion of the heat transfer fluid passage, said first and second portions of the fluid flow passage having a parallel fluid flow relationship;

said source of heat transfer fluid being a heat exchanger;

said first and second heat storage assemblies each further including a heat exchanger in its unit portion means, a circulating fluid passage means mounted in parallel fluid flow relationship with its respective unit portion, a valve means for isolating said storage assembly from the rest of said heat storage system and a pump means for circulating heat transfer fluid in a circuit formed by said respective unit portion and said circulating fluid passage for transferring heat to said heat exchanger.

2. A heat storage system as in claim 1 wherein is further included a first valve coupled between the heat exchanger and the first and second heat storage assemblies and a second valve coupled between said first and second heat storage assemblies, such that when said first valve is closed, fluid will not flow from said heat exchanger to either of said first and second heat storage assemblies, and when said first valve is opened and said second valve is closed, fluid will flow from said heat exchanger to the first heat storage assembly but not said second heat storage assembly, and when both of the valves are open fluid will flow from said heat exchanger to both of said heat storage assemblies.

3. A heat storage system as in claim 1 wherein each of the valve means for isolating such storage assembly from the rest of said heat storage system is activated in response to the container of said heat storage assembly becoming fully charged with heat of fusion.

4. A heat storage system as in claim 1 wherein is further included a valve means in said circulating fluid passage of each said assembly for preventing flow therethrough when said assembly is being charged and for allowing flow therethrough when said assembly is being discharged.

5. A heat storage system as in claim 1 wherein said assembly pump means is activated in response to fluid flow through said heat extractor means.

6. A heat storage assembly comprising:
a heat storage unit including at least one container having fusible substance therein and including a circulation system for allowing circulation of a heat transfer fluid through said unit, in contact with said containers;
a heat exchanger in said unit for contacting heat transfer fluid flowing through said unit, downstream of said at least one container, said separate heat exchanger comprising inlet and outlet tubes for allowing a separate fluid flow into and out of said separate heat exchanger;
an inlet pipe coupled to said unit upstream of said at least one container for providing transfer fluid to said unit from an external source;
an exhaust pipe coupled to said unit, downstream of said at least one container and said separate heat exchanger for transporting heat transfer fluid away from said unit;
a bypass pipe connecting said inlet and outlet pipes, said bypass pipe including a valve therein for closing said bypass pipe when said unit is being charged by said heat transfer fluid, but for opening said bypass pipe to allow heat to be discharged from said unit by said heat exchanger;
a second valve means for isolating the heat transfer fluid in said assembly from said external source; and
a pump means for circulating heat transfer fluid through said bypass pipe, and said unit to allow extraction of heat by said separate heat exchanger.

7. A heat storage assembly as in claim 6 wherein said valve means for isolating the heat transfer fluid of said assembly from said external source is normally open, but is closed in response to said unit becoming fully charged.

8. A heat storage assembly as in claim 6 wherein said circulation valve means is normally closed but is opened in response to said unit becoming fully charged.

9. A heat storage assembly as in claim 6 wherein said pump means is activated by fluid flow through said heat exchanger.

10. A heat storage assembly comprising:
a heat storage unit including at least one container having fusible substance therein and including a circulation system for allowing circulation of a heat transfer fluid from an external source heat through said unit, in contact with said containers;
a separate heat exchanger in said unit for contacting heat transfer fluid flowing through said unit, said separate heat exchanger comprising inlet and outlet tubes for allowing a separate fluid into and out of said separate heat exchanger;
an inlet pipe coupled to said unit for providing transfer fluid to said unit from said external source;
an exhaust pipe coupled to said unit for transporting heat transfer fluid away from said unit;
a bypass pipe mounted in parallel fluid flow relationship with said unit, said bypass pipe including a first valve therein for opening and closing said bypass pipe;
a second valve means for isolating the heat transfer fluid in said unit from said external source; and
a pump means for circulating heat transfer fluid through said bypass pipe and said unit to provide increased interchange of heat between said separate heat exchanger and said heat transfer fluid in said unit.

11. A heat storage assembly as in claim 10 wherein said first valve for isolating the heat transfer fluid of said unit from said external source is normally open, but is closed in response to said unit reaching a predetermined point of heat storage.

12. A heat storage assembly as in claim 10 wherein said second valve means is normally closed but is opened in response to said unit reaching said predetermined point of heat storage.

13. A heat storage assembly as in claim 10 wherein said pump means is activated by fluid flow through said separate heat exchanger.

* * * * *

UNITED STATES PATENT AND TRADEMARK OFFICE
CERTIFICATE OF CORRECTION

PATENT NO. : 4,291,750

DATED : September 29, 1981

INVENTOR(S) : Arthur J. Clyne et al.

It is certified that error appears in the above—identified patent and that said Letters Patent is hereby corrected as shown below:

Column 3, line 34, add a hyphen between "transfer" and "fluid".
Column 4, line 36, change "assembly" to --assemblies--; and
line 41, change both printings of "assembly" to --assemblies--.
Column 8, line 32, "heat" should be placed before "source", line 37, insert --flow-- between "fluid" and "into".

Signed and Sealed this

Twenty-third Day of March 1982

|SEAL|

Attest:

GERALD J. MOSSINGHOFF

Attesting Officer

Commissioner of Patents and Trademarks